United States Patent Office 3,020,276
Patented Feb. 6, 1962

3,020,276
CYCLIC AMIDINES
William B. Hughes, Webster Groves, and Verner L. Stromberg, Shrewsbury, Mo., assignors to Petrolite Corporation, Wilmington, Del., a corporation of Delaware
No Drawing. Filed Mar. 3, 1958, Ser. No. 718,391
7 Claims. (Cl. 260—256.4)

This invention relates to esters of cyclic amidines of the formula

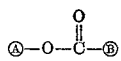

where Ⓐ and Ⓑ are cyclic amidine-containing radicals, for example, imidazoline and tetrahydropyrimidine radicals (hereafter referred to as "amidine esters"). More particularly, this invention relates to esters wherein A contains one type of cyclic amidine ring and B contains the same or another type not selected in A. This invention also relates to a process of preparing these compounds which comprises reacting a hydroxy-containing cyclic amidine with less than a stoichiometric amount of a polycarboxylic acid to form a partial ester and then reacting this partial ester with a polyamine capable of forming a second amidine ring of the same or different type. This invention also relates to using these compounds as corrosion inhibitors in preventing the corrosion of metals, most particularly steel and ferrous metals.

Heretofore, a wide variety of cyclic amidine compounds have been employed to inhibit the corrosion of oil well equipment. Although we had expected that hydroxyaliphatic cyclic amidines would also be effective in inhibiting oil field corrosion, we found that these compounds had very poor corrosion inhibiting properties.

However, we have now unexpectedly discovered that the derivatives of these hydroxyaliphatic cyclic amidines, particularly the amidine esters thereof, are very effective corrosion inhibitors, in many cases 10 or more times as effective as the corresponding hydroxyaliphatic cyclic amidine.

More specifically, in the above formula A and B contain either imidazoles or tetrahydropyrimidine radicals, for example, the following radicals (1)

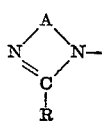

(2)

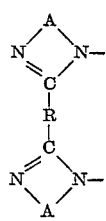

in which

and

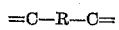

are the residual radicals derived from the carboxylic acids:

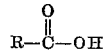

or

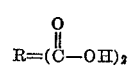

where R comprises, for example, a saturated or unsaturated aliphatic radical, a cycloaliphatic radical, an aryl radical, an aralkyl radical, an alkaryl radical, an alkoxyalkyl radical, an aryloxyalkyl radical, and the like; and A is an alkylene group; for example, ethylene and propylene radicals, such as

—CH₂—CH₂—
—CH₂CH₂CH₂—

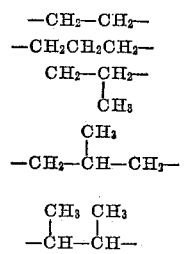

In general, the amidine esters are prepared by reacting a hydroxyaliphatic cyclic amidine Ⓐ—ROH with less than a stoichiometric amount of a polycarboxylic acid to form a half ester

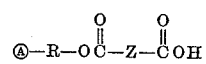

which is subsequently reacted with an amidine forming polyamine to form the amidine ester

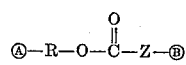

More specifically, the corrosion inhibiting aspect of this invention relates to a method for inhibiting corrosion of ferrous metals by hydrocarbon fluids containing water and corrosive materials such as $H_2S$, $CO_2$, inorganic acids, organic acids, etc., combinations of these materials with each other, combinations of each of said corrosive materials with oxygen, and combinations of said materials with each other and oxygen, which comprises adding to said fluids at least 5 parts per million of the above amidine esters, said compounds being sufficiently soluble in the hydrocarbon fluid to inhibit corrosion.

THE HYDROXY CYCLIC AMIDINE

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. In the present instance, the nitrogen atom of the ring involving two monovalent linkages is substituted with a hydroxy-containing group.

These cyclic amidines are further characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids, polycarboxy acids, and the like.

For details of the preparation of imidazolines substituted in the 2-position from amines, see the following U.S. patents, U.S. No. 1,999,989, dated April 30, 1935, Max Bockmuhl et al.; U.S. No. 2,155,877, dated April 25, 1939, Edmund Waldmann et al.; and U.S. No. 2,155,878, dated April 25, 1939, Edmund Waldmann et al. Also see Chem. Rev. 32, 47 (43), and Chem. Rev. 54, 593 (54).

Equally suitable for use in preparing compounds of our invention and for the preparation of tetrahydropyrimidines substituted in the 2-position are the polyamines containing at least one primary amino group and at least one secondary amino group, or another primary amino group separated from the first primary amino group by three carbon atoms instead of being separated by only 2 carbons as with imidazolines. This reaction, as in the case of the imidazolines, is generally carried out by heating the reactants to a temperature at which 2 mols of water are evolved and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Kark Kiescher, Ernst Urech and Willi Klarer, and U.S. Patent No. 2,194,419, dated March 19, 1940, to August Chwala.

Substituted imidazolines and tetrahydropyrimidines are obtained from a variety of acids beginning with the one-carbon acid (formic) through and including higher fatty acids or the equivalent having as many as 32 carbon atoms. Modified fatty acids also can be employed as, for example, phenyl stearic acid or the like. Cyclic acids may be employed, including naphthenic acids. A variety of other acids including benzoic acid, substituted benzoic acid, salicyclic acid, and the like, have been employed to furnish the residue

from the acid RCOOH in which the C of the residue

is part of the ring. The fatty acids employed, for example, may be saturated or unsaturated. They may be hydoxylated or nonhydroxylated. Branched long chain fatty acids may be employed. See J. Am. Chem. Soc. 74, 2523 (1952). This applies also to the lower molecular weight acids as well.

Among sources of such acids may be mentioned straight chain and branched chain, saturated and unsaturated, aliphatic, cycloaliphatic, aromatic, hydroaromatic, aralkyl acids, etc.

Examples of saturated aliphatic monocarboxylic acids comprise: acetic, propionic, butyric, valeric, caproic, heptanoic, caprylic, nonanoic, capric, undecanoic, lauric, tridecanoic, myriatic, pentadecanoic, palmitic, heptadecanoic, stearic, nonadecanoic, eicosanoic, heneiconsnoic, docosanoic, tricosanoic, tetracosanoic, pentacosanoic, cerotic, heptacosanoic, montanic, nonacosanoic, melissic and the like.

Examples of ethylenic unsaturated aliphatic acids comprise: acrylic, methacrylic, crotonic, anglic, teglic, the pentenoic acids, the hexenoic acids, for example, hydrosorbic acid, the heptenoic acids, the octenoic acids, the nonenoic acids, the decenoic acids, for example, obtusilic acid, the undecenoic acids, the dodencenoic acids, for example, lauroleic, linderic, etc., the tridecenoic acids, the tetradecenoic acids, for example, myristoleic acid, the pentadecenoic acids, the hexadecenoic acids, for example, palmitoleic acid, the heptadecenoic acids, the octodecenoic acids, for example, petrosilenic acid, oleic acid, elardic acid, the nonadecenoic acids, for example, the eicosenoic acids, the docosenoic acids, for example, erucic acid, brassidic acid, cetoleic acid, the tetracosenic acids, and the like.

Examples of dienoic acids comprise the pentadienoic acids, the hexadienoic acids, for example, sorbic acid, the octadienoic acids, for example, linoleic, and the like.

Examples of the trienoic acids comprise the octadecatrienoic acids, for example, linolenic acid, eleostearic acid, pseudo-eleostearic acid, and the like.

Carboxylic acids containing function groups such as hydroxy groups can be employed. Hydroxy acids, particularly the alpha hydroxy acids comprise glycolic acid, lactic acid, the hydroxyvaleric acids, the hydroxy caproic acids, the hydroxyheptanoic acids, the hydroxy caprylic acids, the hydroxynonanoic acids, the hydroxycapric acids, the hydroxydecanoic acids, the hydroxy lauric acids, the hydroxy tridecanoic acids, the hydroxymyristic acids, the hydroxypentadecanoic acids, the hydroxypalmitic acids, the hydroxyhexadecanoic acids, the hydroxyheptadecanoic acids, the hydroxy stearic acids, the hydroxyoctadecenoic acids, for example, ricinoleic acid, ricinelaric acid, hydroxyoctadecynoic acids, for example, ricinstearolic acid, the hydroxyeicosanoic acids, for example, hydroxyarachidic acid, the hydroxydocosanoic acids, for example, hydroxybehenic acid, and the like.

Examples of acetylated hydroxyacids comprise ricinoleyl lactic acid, acetyl ricinoleic acid, chloroacetyl ricinoleic acid, and the like.

Examples of the cyclic aliphatic carboxylic acids comprise those found in petroleum called naphthenic acids, hydrocarbic and chaulmoogric acids, cyclopentane carboxylic acids, cyclohexanecarboxylic acid, campholic acid, fencholic acids, and the like.

Examples of aromatic monocarboxylic acids comprise benzoic acid, substituted benzoic acids, for example, the toluic acids, the xyleneic acids, alkoxy benzoic acid, phenyl benzoic acid, naphthalene carboxylic acid, and the like.

Mixed higher fatty acids derived from animal or vegetable sources, for example, lard, coconut oil, rapeseed oil, sesame oil, palm kernel oil, palm oil, olive oil, corn oil, cottonseed oil, sardine oil, tallow, soyabean oil, peanut oil, castor oil, seal oils, whale oil, shark oil, and other fish oils, teaseed oil, partially or completely hydrogenated animal and vegetable oils are advantageously employed. Fatty and similar acids include those derived from various waxes, such as beeswax, spermaceti, montan wax, Japan wax, coccerin and carnauba wax. Such acids include carnaubic acid, cerotic acid, lacceric acid, montanic acid, psyllastearic acid, etc. One may also employ higher molecular weight carboxylic acids derived by oxidation and other methods, such as from paraffin wax, petroleum and similar hydrocarbons; resinic and hydroaromatic acids, such as hexahydrobenzoic acid, hydrogenated naphthoic, hydrogenated carboxy diphenyl, naphthenic, and abietic acid, aralkyl and aromatic acids, such as Twitchell fatty acids, naphtholic acid, carboxydiphenyl pyridine carboxylic acid, blown oils, blown oil fatty acids and the like.

Other suitable acids include phenylstearic acid, benzoylnonylic acid, cetyloxybutyric acid, cetyloxyacetic acid, chlorostearic acid, etc.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, acenitic acids, and the like.

Examples of aromatic polycarboxylic acids comprise phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfone dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and polymeric acids, for example, diricinoleic acid, triricinoleic acid, polyricinoleic acid, and the like. Other polycarboxylic acids comprise those containing ether groups, for example, diglycollic acid. Mixtures of the above acids can be advantageously employed.

In addition, acid precursors such as esters, acid chlorides, glycerides, etc. can be employed in place of the free acid.

Where the acid contains a functional group, for example, a hydroxy group, this should be taken into consideration in calculating the stoichiometry of the subsequent acylation.

Hydroxy substituted imidazolines and tetrahydropyrimidines can be obtained in the manner described above from a wide variety of polyamines containing hydroxy groups. Thus, where one starts with a polyamine, for example, a diamine of the following formula

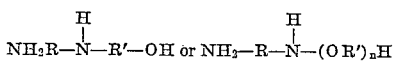

where R has for example 2 or 3 carbons in its main chain one obtains the compounds of this invention. In addition, one can start with ethylene diamine or with 1,2-propylene diamine, 1,3-propylenediamine or other polyamines and then react the cyclic amidine so obtained with alkylene oxides so as to produce a terminal hydroxy group since the nitrogen bonded hydrogen on the 1-position on the ring reacts with alkylene oxides. Polyoxyalkylated cyclic amidines can be prepared by reacting a hydroxyalkylcyclic amidine with an alkylene oxide.

Alkylene oxides comprise those of the general formula

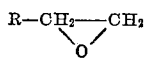

where R is an alkyl group. Among the alkylene oxides that may be employed are ethylene, propylene, butylene, octylene, etc., oxides. Other oxyalkylation agents such as glycide, epichlorohydrin, etc., can be employed.

Thus, compounds within the scope of this invention which react with polycarboxylic acids comprise compounds of the formulae:

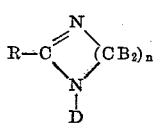

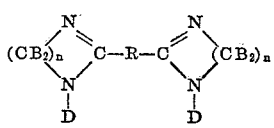

where

is the residue derived from the carboxylic acid, where R is a hydrocarbon radical having, for example, up to about 32 carbon atoms, hydrocarbons in which the carbon atom chain is interrupted by oxygen, etc., $n$ is 2 or 3; B is a hydrogen or a hydrocarbon radical, for example, an alkyl radical; and D is a hydroxy-containing radical, for example, —ROH or —(RO)$_n$H, wherein $n$ is a whole number, for example, 1–10 or higher, but preferably 1–5, and CB$_2$ is, for example, a divalent radical of the formula —CH$_2$—CH$_2$—, —CH$_2$—CH$_2$—CH$_2$—,

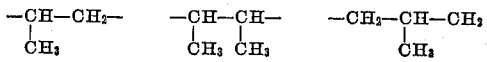

etc.

In general, the hydroxy alkyl cyclic amidines are prepared by reacting a polyamine containing a terminal alkanol group with a carboxylic acid at temperatures of from 150–175° C. employing an azeotroping agent such as xylene to remove water. The reaction time of 3–4 hours is employed. Completion of reaction is judged by the separation of 2 moles of H$_2$O for each carboxylic acid group.

Since the preparation of cyclic amidines is so well known (see above cited patents), it is not believed that any examples are necessary to illustrate such a well known procedure. However, for purposes of illustration the following are included:

*Example 10a*

A solution of 1 mole of hydroxyethyl ethylene diamine,

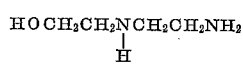

and 1 mole of oleic acid in 300 grams of xylene are charged to a flask and brought to reflux, the mixture being heated under a Dean Stark water trap condenser in order to distill off the water-xylene azeotrope mixture, to separate the water and to continuously return xylene to the reaction mixture. Reflux is continued at a temperature of 160–170° C. for about 3½ hours until about 2 moles of water are removed. The product is

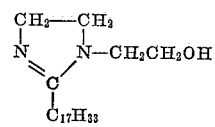

*Example 9b*

The above example is repeated except that hydroxy ethyl propylene diamine 1-3,

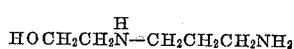

is employed in place of hydroxyethylethylene diamine and stearic acid is employed in place of oleic acid. The product produced is

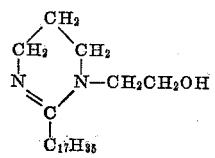

*Example 4c*

The process of Example 10a is repeated with the same amine

(2 moles) and a polycarboxylic acid, sebacic acid (1 mole). Instead of two moles of water being removed, as in the prior example, 4 moles of water are removed. The product is

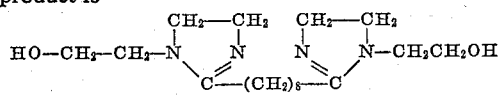

*Example 20d*

The process of Example 4c is repeated with

HOCH₂CH₂NCH₂CH₂CH₂NH₂
          |
          H

(2 moles) and a polycarboxylic acid, terephthalic acid (1 mole). As in the prior Example, 4 moles of water are removed. The product is

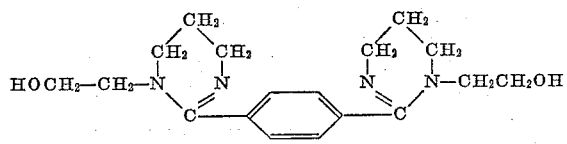

In general, to form the polyoxyalkylated hydroxy cyclic amidines, the hydroxyalkylcyclic amidine is first prepared in the manner shown above and then reacted with alkylene oxides by the conventional manner of oxyalkylation using a jacketed stainless steel autoclave in the manner described in U.S. Patent 2,792,369 to the desired degree of oxyalkylation. The following examples are illustrative:

*Example 11a*

One mole of

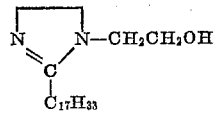

(50% solution in xylene) is reacted with 1 mole of ethylene oxide at a temperature of 125–130° C. and a pressure of 10–15 p.s.i. The time regulator is set to add ethylene oxide over ½ hour followed by additional stirring for another ½ hour to insure complete reaction. Ethylene oxide is readily taken up by the reactants. The product is

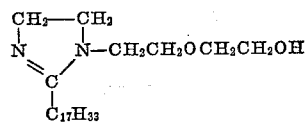

*Example 12a*

The above example is repeated using a propylene oxide and

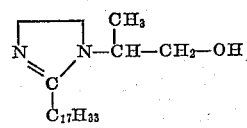

under similar conditions. The product is

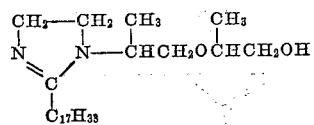

*Example 28a*

Example 11a is repeated except that 2 moles of ethylene oxide are employed. The product is

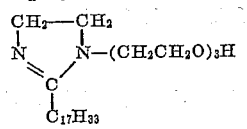

The above examples are typical methods of preparation. The following hydroxy cyclic amidines are prepared by these methods.

TABLE I

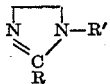

| Ex. No. | RCOOH source of RC | R' |
|---|---|---|
| 1a | Lauric | CH₂CH₂OH |
| 2a | Hexanoic | CH₂CH₂OH |
| 3a | Isovaleric | CH₂CH₂OH |
| 4a | Stearic | CH₂CH₂OH |
| 5a | Melissic | CH₂CH₂OH |
| 6a | Phenyl stearic | CH₂CH₂OH |
| 7a | Benzoic | CH₂CH₂OH |
| 8a | Creosotinic | CH₂CH₂OH |
| 9a | Naphthenic | CH₂CH₂OH |
| 10a | Oleic | CH₂CH₂OH |
| 11a | do | CH₂CH₂OCH₂CH₂OH |
| 12a | do | (CH₃)CHCH₂O—(CH₃)CHCH₂OH |
| 13a | Lauric | CH₂CH₂OCH₂CH₂OH |
| 14a | Palmitic | CH₂CH₂OCH₂CH₂OH |
| 15a | Cerotic | CH₂CH₂OCH₂CH₂OH |
| 16a | p-tert-Butyl benzoic | CH₂CH₂OCH₂CH₂OH |
| 17a | Benzoic | CH₂CH₂OCH₂CH₂OH |
| 18a | Toluic | CH₂CH₂OCH₂CH₂OH |
| 19a | Naphthenic | CH₂CH₂OCH₂CH₂OH |
| 20a | Benzoic | CH₂CH₂OCH₂CH₂OH |
| 21a | Formic | CH₂CH₂OC₂H₂CH₂OCH₂CH₂OH |
| 22a | Methyloctadecanoic | CH₂CH₂OC₂H₂CH₂OCH₂CH₂OH |
| 23a | Capric | CH₂CH₂OC₂H₂CH₂OCH₂CH₂OH |
| 24a | Stearic | CH₂CH₂OC₂H₂CH₂OCH₂CH₂OH |
| 25a | Phenylstearic | CH₂CH₂OC₂H₂CH₂OCH₂CH₂OH |
| 26a | Cresotinic | CH₂CH₂OC₂H₂CH₂OCH₂CH₂OH |
| 27a | Linoleic | CH₂CH₂OC₂H₂CH₂OCH₂CH₂OH |
| 28a | Oleic | CH₂CH₂OC₂H₂CH₂OCH₂CH₂OH |
| 29a | 3-methoxybenzoic | CH₂CH₂OC₂H₂CH₂OCH₂CH₂OH |
| 30a | Naphthenic | CH₂CH₂OC₂H₂CH₂OCH₂CH₂OH |

TABLE II

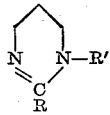

| Ex. No. | RCOOH source of RC | R' |
|---|---|---|
| 1b | Formic | CH₂CH₂OH |
| 2b | Acetic | CH₂CH₂OH |
| 3b | Butyric | CH₂CH₂OH |
| 4b | Valeric | CH₂CH₂OH |
| 5b | Isovaleric | (CH₃)CHCH₂OH |
| 6b | Trimethyl acetic | CH₂CH₂OH |
| 7b | Pelargonic | CH₂CH₂OH |
| 8b | Lauric | CH₂CH₂OCH₂CH₂OH |
| 9b | Stearic | CH₂CH₂OH |
| 10b | Arachidic | CH₂CH₂OH |
| 11b | Eucosane-carboxylic | (CH₃)CHCH₂OH |
| 12b | Cerotic | CH₂CH₂OH |
| 13b | Melissic | CH₂CH₂OH |
| 14b | Phenyl stearic | CH₂CH₂OH |
| 15b | Benzoic | CH₂CH₂OCH₂CH₂OH |
| 16b | b-Methybenzoic acid | CH₂CH₂OH |
| 17b | Cresotinic | CH₂CH₂OH |
| 18b | p-Methybenzoic | CH₂CH₂OH |
| 19b | p-tert-Butylbenzoic | CH₂CH₂OH |
| 20b | 3-Methoxybenzoic | CH₂CH₂OH |
| 21b | Oleic | CH₂CH₂OH |
| 22b | Undecylenic | CH₂CH₂OH |
| 23b | Linoleic | CH₂CH₂OH |
| 24b | Butyric | CH₂CH₂OH |
| 25b | Methyloctadecanoic | CH₂CH₂OH |

TABLE III

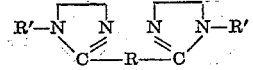

| Ex. No. | HOOC—R—COOH source of —CRC— | R' |
|---|---|---|
| 1c | Succinic | CH₂CH₂OH |
| 2c | Adipic | CH₂CH₂OH |
| 3c | Suberic | CH₂CH₂OH |
| 4c | Sebacic | CH₂CH₂OH |
| 5c | Nonodecane dicarboxylic | CH₂CH₂OH |
| 6c | Diglycolic | CH₂CH₂OH |
| 7c | Ethylene bis(glycolic) | CH₂CH₂OH |
| 8c | Methylene dibenzoic | CH₂CH₂OH |
| 9c | Stearyl malonic | CH₂CH₂OH |

TABLE III—Continued

| Ex. No. | HOOC—R—COOH source of —CRC— | R' |
|---|---|---|
| 10c | Phthalic | CH₂CH₂OH |
| 11c | Succinic | CH₂CH₂OCH₂CH₂OH |
| 12c | Glutaric | CH₂CH₂OCH₂CH₂OH |
| 13c | Pimelic | CH₂CH₂OCH₂CH₂OH |
| 14c | Azelaic | CH₂CH₂OCH₂CH₂OH |
| 15c | Eicosane dicarboxylic | CH₂CH₂OCH₂CH₂OH |
| 16c | Dilinoleic | CH₂CH₂OCH₂CH₂OH |
| 17c | Isophthalic | CH₂CH₂OCH₂CH₂OH |
| 18c | Diglycolic | CH₂CH₂OCH₂CH₂OH |
| 19c | Lauryl malonic | CH₂CH₂OCH₂CH₂OH |
| 20c | Methylene dibenzoic | CH₂CH₂OCH₂CH₂OH |
| 21c | Adipic | CH₂CH₂OCH₂CH₂OCH₂CH₂OH |
| 22c | Succinic | CH₂CH₂OCH₂CH₂OCH₂CH₂OH |
| 23c | Suberic | CH₂CH₂OCH₂CH₂OCH₂CH₂OH |
| 24c | Pimelic | CH₂CH₂OCH₂CH₂OCH₂CH₂OH |
| 25c | Nonedecane dicarboxylic | CH₂CH₂OCH₂CH₂OCH₂CH₂OH |
| 26c | Diglycolic | CH₂CH₂OCH₂CH₂OCH₂CH₂OH |
| 27c | Methylene dibenzoic | CH₂CH₂OCH₂CH₂OCH₂CH₂OH |
| 28c | Stearyl malonic | CH₂CH₂OCH₂CH₂OCH₂CH₂OH |
| 29c | Stearyl succinic | CH₂CH₂OCH₂CH₂OCH₂CH₂OH |
| 30c | Terephthalic | CH₂CH₂OCH₂CH₂OCH₂CH₂OH |

TABLE IV

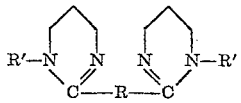

| Ex. No. | HOOC—R—COOH source of —CRC— | R' |
|---|---|---|
| 1d | Phthalic | CH₂CH₂OH |
| 2d | Succinic | CH₂CH₂OH |
| 3d | Glutaric | CH₂CH₂OH |
| 4d | Adipic | CH₂CH₂OH |
| 5d | Suberic | (CH₃)CHCH₂OH |
| 6d | Sebacic | CH₂CH₂OH |
| 7d | Pimelic | CH₂CH₂OCH₂CH₂OH |
| 8d | Azelaic | CH₂CH₂OH |
| 9d | Nonodecane dicarboxylic | CH₂CH₂OH |
| 10d | Eicosane dicarboxylic | CH₂CH₂OH |
| 11d | Diglycolic | CH₂CH₂OH |
| 12d | Ethylene bisglycolic | (CH₃)CHCH₂OH |
| 13d | Methylene dicarboxylic acid | (CH₃)CHCH₂OH |
| 14d | Dilinoleic | CH₂CH₂OH |
| 15d | Stearyl malonic | CH₂CH₂OH |
| 16d | Lauryl succinic | CH₂CH₂OH |
| 17d | Isotetradecyl succinic | CH₂CH₂OH |
| 18d | Phthalic | CH₂CH₂OCH₂CH₂OH |
| 19d | Isophthalic | CH₂CH₂OH |
| 20d | Terephthalic | CH₂CH₂OH |
| 21d | Glutaconic | CH₂CH₂OH |
| 22d | Sebacic | CH₂CH₂OH |

THE POLYCARBOXYLIC ACIDS

The polycarboxylic acid employed to react with the hydroxycyclicamidine can be varied widely. In general, they can be expressed as

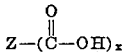

where Z comprises a saturated or unsaturated aliphatic radical, a cycloaliphatic radical, an aromatic radical, and the like, and $x$ is a whole number equal to 2 or more, for example, 2–4, but preferably 2.

Examples of the polycarboxylic acids comprise those of the aliphatic series, for example, oxalic, malonic, succinic, glutaric, adipic, pimelic, suberic, azelaic, sebacic, nonanedicarboxylic acid, decanedicarboxylic acids, undecanedicarboxylic acids, and the like.

Examples of unsaturated aliphatic polycarboxylic acids comprise fumaric, maleic, mesoconic, citraconic, glutonic, itaconic, muconic, aconitic acids, and the like.

Examples of aromatic polycarboxylic acids comprise phthalic, isophthalic acids, terephthalic acids, substituted derivatives thereof (e.g. alkyl, chloro, alkoxy, etc. derivatives), biphenyldicarboxylic acid, diphenylether dicarboxylic acids, diphenylsulfane dicarboxylic acids and the like.

Higher aromatic polycarboxylic acids containing more than two carboxylic groups comprise hemimellitic, trimellitic, trimesic, mellophanic, prehnitic, pyromellitic acids, mellitic acid, and the like.

Other polycarboxylic acids comprise the dimeric, trimeric and other poly acids, for example, dilinoleic acid, trilinoleic acid, polylinoleic acid, and the like such as those prepared by Emery Industries. Other polycarboxylic acids comprise those containing ether groups, for example, diglycolic acid. Mixtures of the above acids can be advantageously employed.

In addition, acid precursors such as esters, anhydrides, glycerides, etc. can be employed in place of the free acid.

THE PARTIAL ESTER PRODUCTS

The products of this invention are partial esters of cyclic amidines. They may be expressed by the following general formula:

wherein A comprises a molecule containing at least one cyclic amidine group having at least one ester side-chain. The

of the formula indicates that the product is a partial ester having at least one free carboxylic acid group.

Thus, the products of this invention may be illustrated with dicarboxylic acids as follows:

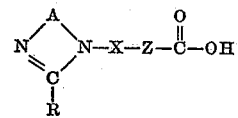

where X includes a

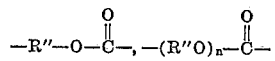

etc. group and Z is the radical derived from the polycarboxylic acid.

In the case where bicyclic amidine compounds are used as hydroxy precursors, the following partial esters are formed wherein X and Z have the meanings of the preceding formula:

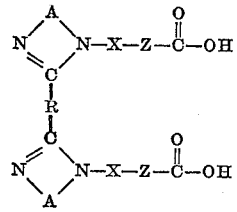

To insure the presence of a terminal carboxyl group on the bicyclic amidine, one employs a partial ester of the polycarboxylic acid or the acid anhydride under mild conditions, or the like, and then reacts this product with the appropriate diamine to form an amidine group.

Since the hydroxy precursor in the case of the bicyclic amide is bifunctional (i.e., has two hydroxy groups), and the polycarboxylic acid is also polyfunctional, polyesters might otherwise be formed. However, these polyesters are also useful in further reaction according to the present invention provided they are partial esters (i.e., have at least one free carboxylic acid group), and are soluble in well fluids.

The following examples are illustrative of the preparation of partial esters. Two moles of carboxylic acid radicals are employed for each mole of hydroxy group.

Example 10aB

One mole of the product of Example 10a and 1 mole of sebacic acid are dissolved in 300 g. of xylene and the reaction mixture, heated to reflux, is azeotroped, using a Dean-Stark trap in the manner of Example 10a, until one mole of water is removed. The temperature is maintained at 150–175° C. and the time is 5 hours. The product is

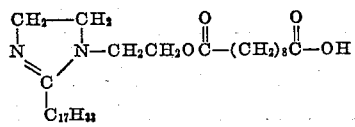

*Example 10aC*

The process of the prior example is repeated except that terephthalic acid is employed in place of sebacic acid. The product is

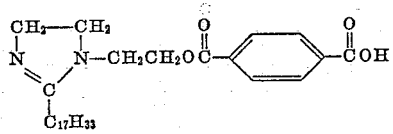

*Example 10aD*

The above example is repeated employing 1 mole of

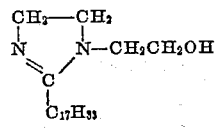

and 1 mole of dimeric (dilinoleic) acid to yield

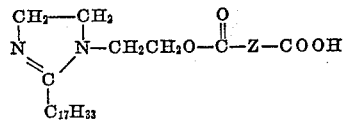

where Z is the dilinoleic acid residue.

*Example 9bA*

The process of the above example is repeated except that 1 mole of

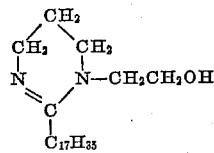

is reacted with 1 mole of adipic acid.
The product is

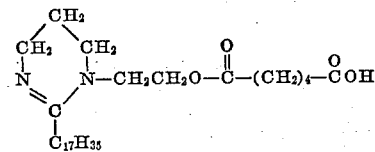

*Example 4cA*

To one mole of

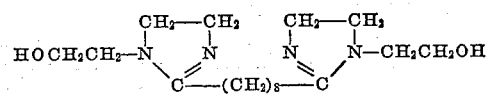

is added 2 moles of succinic anhydride over a period of ½ hour, the addition being carried out at 50° C. The product is

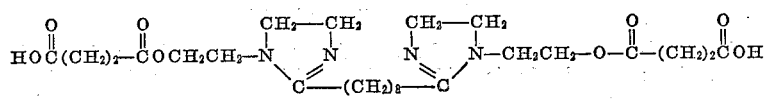

*Example 28aA*

The process of Example 9bA is repeated except that 1 mole of

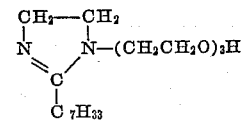

and 1 mole of diglycolic acid are employed. The product is

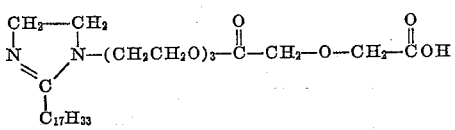

The above examples are typical methods of preparation. The following partial esters are prepared by these methods. The c and d series are prepared by the use of the half ester of the dicarboxylic acid or with the anhydride. Each partial ester will have the basic number shown in the prior tables, for example, 1a, 10a, etc., indicative of the hydroxy cyclic amidine employed. In addition, it will bear the letter A, B, etc., which indicates that it has been acylated to a partial ester. In each example one mole of discarboxylic acid is employed for each mole of hydroxy group present.

THE DIAMIDINE ESTERS

The diamidine esters are prepared by reacting the partial ester (or the partial ester having the reactive carboxylic group protected with an ester of a low boiling alcohol), with the desired diamine. As stated above, imidazolines are formed by reacting a carboxylic acid with polyamines containing at least one primary amino group and at least one secondary amino group or another primary group separated from the first primary amino by 2 carbons, whereas tetrahydropyrimidine is formed by reacting the partial ester with the corresponding polyamine containing 3 carbon atoms. This reaction is carried out until 2 moles of water are removed for each carboxylic acid group. These compounds are in essence "cyclic amidine esters" formed from a cyclic amidine alcohol and a cyclic amide carboxylic acid. Thus, they are in essence the theoretical product of the reaction

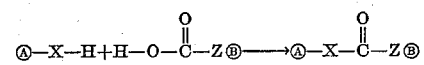

where X comprises —R'O, —(R'O)$_n$, etc. and Z is the residual group derived from the carboxylic acid. They may also be expressed by the formula

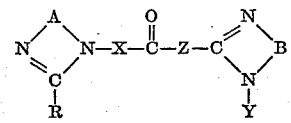

where R, X, and Z have the meanings stated above, and A and B, which may be the same or different, have a main chain of 2 or 3 carbons, and Y, which is the residual group, comprises hydrogen, a hydrocarbon group,

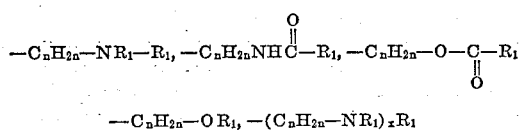

another cyclic amidine group, etc. wherein R$_1$ comprises hydrogen, hydrocarbon groups, etc. and n is 1–6 or higher. Examples of Y comprise ethylene amino groups, hydroxy-ethyl amino groups, aminoalkyl groups, alkyleneoxyalkyl groups, hydrocarbon groups, such as alkyl, cycloalkyl, aralkyl, alkaryl, etc.

Where the bicyclic amidines are used as hydroxy precursors, the following compounds are formed:

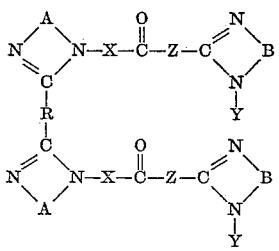

having the same meaning as in the prior formula.

Thus, where the imidazoline of Example 4a

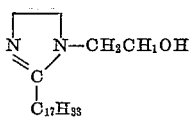

is reacted with one mole of adipic acid, one obtains the partial ester

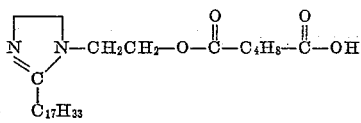

This partial ester is then reacted with a polyamine capable of forming an imidazoline or a tetrahydropyrimidine ring, for example, a 1,3-propylenediamine, or an ethylene diamine or polyethylenepolyamine, etc. Thus, where the partial ester is reacted with

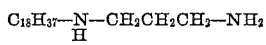

one obtains a mixed amidine ester

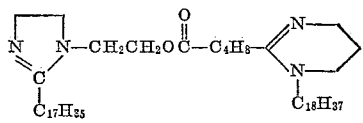

On the other hand, where the alcoholic moiety of the mixed amidine is prepared from N-hydroxyethyl 1,3-propanediamine reacted with lauric acid

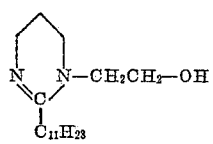

which is then reacted with one mole of terephthalic acid to yield:

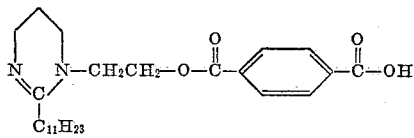

This is then reacted with:

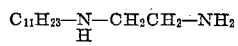

to yield a mixed amidine ester of the formula:

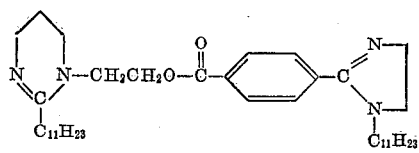

By varying the polyamines the amidine rings can be varied. Since the polyamine capable of forming cyclic amidines with carboxylic acids is so well known, it is unnecessary to state in detail all the polyamines that can be employed. Many are disclosed in the section of this specification which discusses the preparation of cyclic amidines. However, it might be mentioned that the preferable polyamines are those which form cyclic amidines where Y is hydrogen, a radical of the

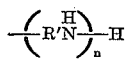

series, or N-alkylated derivatives of this polyalkylene amine series. Examples of polyamines which can be used in producing the amidine esters can be found in the Blair and Gross Reissue Patent No. 23,227 (which is herein incorporated by reference) and in other publications and patents disclosing amidine-forming polyamines.

An example of suitable amines is found in the "Duomeens" of Armour Chemical Division described in their booklet. They are compounds of the formula

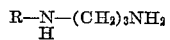

where the R's are derived from fatty acids: Duomeen 12 from lauric acid, Duomeen C from coconut, Duomeen S from soya and Duomeen T from tallow.

The R group of Duomeen 12 is composed of dodecyl 95%, decyl 2%, tetradecyl 3%; Duomeen C, octyl 8%, decyl 9%, dodecyl 47%, tetradecyl 18%, hexadecyl 8%, octadecyl 5%, octadecenyl 5%; Duomeen S, hexadecyl 20%, octadecyl 17%, octadecenyl 26%, octadecadienyl 37%; Duomeen T, tetradecyl 2%, hexadecyl 24%, octadecyl 28%, octadecenyl 46%.

The following examples are presented to illustrate the preparation of the amidine esters. These are prepared in the manner described for preparing the hydroxyalkyl cyclic amidines.

*Example 10aB₁*

One mole of the partial ester produced in Example 10aA is added to a xylene solution of 1 mole of propylene diamine (50% solution by weight) in a reaction flask. The reaction mixture is brought to reflux as the reaction mixture is heated under a Dean-Stark trap condenser to distill off the water-xylene azeotropic mixture to separate the water and to return xylene to the reaction mixture. Reflux is continued at a temperature of 150–175° C. for about 4 hours until about 2 moles of water are removed. The product is

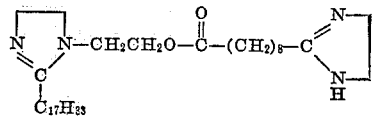

*Example 10aB₂*

The above example is repeated employing 10aA and $$NH_2CH_2CH_2\overset{H}{N}-CH_2CH_2NH_2$$

The product is

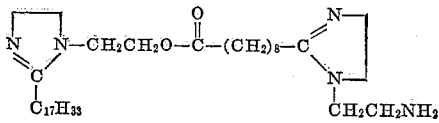

Example 10aC₁

The prior example is repeated employing the product of 10aC and "Duomeen S" (Armour Co.),

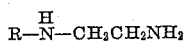

the R group is derived from soya.

The product formed is

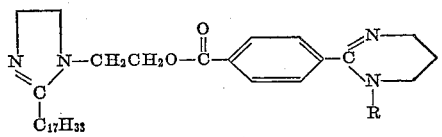

Example 9bA₁

The process of the prior example is repeated employing the product of 9bA and Amine ODT (Monsanto Chemical),

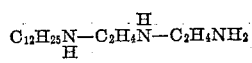

The product is

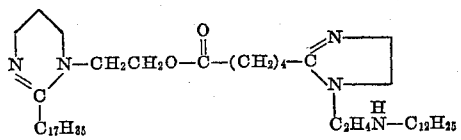

Example 4cA₁

The process of the prior example is repeated employing the product of 4cA and

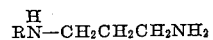

Duomeen T (Armour Co.), R derived from tallow. The product is

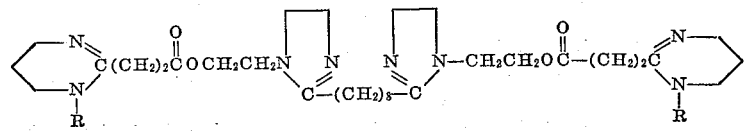

Example 28aA₁

The process of the prior example is repeated employing the product of Example 28aA and Duomeen T. The product is

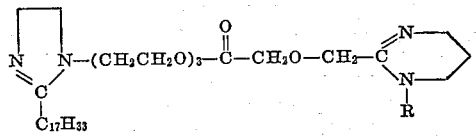

TABLE V
*Partial esters*

| | | | |
|---|---|---|---|
| 2aA | Adipic. | 9bC | Terephthalic. |
| 4aA | Sebacic. | 9bD | Succinic. |
| 4aB | Terephthalic. | 21bA | Sebacic. |
| 10aA | Adipic. | 21bB | Terephthalic. |
| 10aB | Sebacic. | 4cA | Succinic (as anhydride). |
| 10aC | Terephthalic. | 4cB | Terephthalic (as monobutyl ester). |
| 10aD | Dilinoleic. | | |
| 10aE | Succinic. | 6cA | Succinic (as anhydride). |
| 13aA | Sebacic. | 6cB | Pimelic (as monobutyl ester). |
| 13aB | Adipic. | | |
| 15aA | Suberic. | 6cC | Adipic (as monobutyl ester). |
| 15aB | Dilinoleic. | 14cA | Succinic (as anhydride). |
| 24aA | Adipic. | 14cB | Do. |
| 24aB | Isophthalic. | 23cA | Do. |
| 28aA | Diglycolic. | 23cB | Phthalic (as anhydride). |
| 8bA | Adipic. | 23cC | Adipic (as anhydride). |
| 9bA | Do. | 8dA | Do. |
| 9bB | Sebacic. | 8dB | Sebacic (as anhydride). |

The above examples are typical methods of preparation. The following amidine esters are prepared by these methods.

TABLE VI
*Amidine esters*

| Ex. | Polyamine |
|---|---|
| 2aA₁ | Propylenediamine |
| 4aA₁ | Dipropylenetriamine |
| 10aA₁ | NH₂(CH₂)₃N(H)—CH₂CH₂OH |
| 10aA₂ | NH₂(CH₂)₂N(H)—CH₂CH₂OH |
| 10aB₁ | Propylenediamine |
| 10aB₂ | Diethylenetriamine |
| 10aC₁ | Duomeen-S |
| 13aA₁ | Duomeen T |
| 13aB₁ | Dipropylenetriamine |
| 15aA₁ | C₁₈H₃₅—N(H)—(CH₂)₃N(H)—CH₂CH₂OH |
| 15aB₁ | Dipropylenetriamine |
| 24aA₁ | Duomeen S |
| 28aA₁ | Duomeen T |
| 8bA₁ | Triethylenetetramine |
| 9bA₁ | C₁₂H₂₅N(H)—(CH₂)₂N(H)—(CH₂)₂NH₂ |
| 9bB₁ | Diethylenetriamine |
| 9bC₁ | NH₂(CH₂)₂N(H)—CH₂CH₂OH |
| 9bD | Triethylenetetramine |
| 21bA₁ | C₁₂H₂₅N(H)—(CH₂)₂N(H)—(CH₂)₂NH₂ |
| 4cA₁ | Duomeen T |
| 4cB₁ | Duomeen S |
| 6cA₁ | Dipropylenetriamine |
| 6cB₁ | Duomeen T |
| 14cA₁ | Duomeen S |
| 23cH₁ | Duomeen T |
| 8dA₁ | C₁₈H₃₅—N(H)—(CH₂)₃NH₂ |

USE AS CORROSION INHIBITOR

More specifically, this phase of the invention relates to the inhibition of corrosion in the petroleum industry with specific reference to producing wells, pipe lines, refineries, tank storage, etc.

The use of a corrosion inhibiting agent in the oil industry and other industries, and particularly for the protection of ferrous metals, is well known. For example, see U.S. Patents Nos. 2,736,658, dated February 28, 1954, to Pfohl et al., and 2,756,211, dated July 24, 1956, to Jones, and 2,727,003, dated December 13, 1955, to Hughes.

More specifically then, and particularly from the standpoint of oil production, this aspect of the invention relates to inhibiting corrosion caused by hydrogen sulfide, carbon dioxide, inorganic acids, organic acids, combinations of each with oxygen, and with each other and oxygen. More particularly, it relates to treating wells to mitigate metal corrosion and associated difficulties.

It should also be pointed out that the corrosiveness of oil well brines will vary from well to well, and the proportion of corrosion inhibiting agent added to the well fluids should also be varied from well to well. Thus, in some wells it may be possible to effectively control corrosion by the addition of as little as 5 p.p.m. of our new compositions to the well fluids, whereas in other wells, it may be necessary to add 200 p.p.m. or more.

In using our improved compositions for protecting oil well tubing, casing and other equipment which comes in contact with the corrosive oil-brine production, we find that excellent results may be obtained by injecting an appropriate quantity of a selected composition into a producing well so that it may mingle with the oil-brine mixture and come into contact with the casing, tubing, pumps and other producing equipment. We may, for example, introduce the inhibiting composition into the top of the casing, thus causing it to flow down into the well and thence back through the tubing, etc. In general, we have found that this procedure suffices to inhibit corrosion throughout the entire system of production, and collection, even including field tankage.

In case serious emulsion or gel problems are encountered, demulsifiers may be added. Th's is important not only to avoid the troublesome emulsions and gels themselves, but also to improve corrosion inhibition. The explanation of less effective corrosion inhibition in the presence of emulsions apparently is that the inh bitor is somewhat surface-active. That is, it is concentrated at interfacial surfaces. Since this surface is great in an emulsion, most of the inhibitor will be concentrated in these interfaces and l:ttle will remain in the body of the oil for deposition on the metal surfaces. In many wells, oil-in-water type emulsions often occur naturally. In such wells the inhibitors, herein described tending to form water-in-oil type emulsions, often decrease the emulsion problems naturally present. Thus, in addition to being effective corrosion inhibitors, the herein described products tend to eliminate emulsion problems which sometimes appear when some of the present day inhibitors are used in oil wells or refinery processing.

The method of carrying out our process is relatively simple in pr:nciple. The corrosion preventive reagent is dissolved in the liquid corrosive medium in small amounts and is thus kept in contact with the metal surface to be protected. Alternatively, the corrosion inhibitor may be applied first to the metal surface, either as is, or as a solution in some carrier liquid or paste. Continuous application, as in the corrosive solution, is the preferred method however.

The present process finds particular utility in the protection of metal equipment of oil and gas wells, especially those containing or producing an acidic const'tuent such as $H_2S$, $CO_2$, organic acids, $O_2$ and the like. For the protection of such wells, the reagent, either undiluted or dissolved in a suitable solvent, is fed down the annulus of the well between the casing and producing tubing where it becomes commingled w:th the fluid in the well and is pumped or flowed from the well with these fluids, thus contacting the inner wall of the casing, the outer and inner wall of tubing, and the inner surface of all well-head fittings, connections and flow lines handling the corrosive fluid.

Where the inhibitor compos'tion is a liquid, it is conventionally fed into the well annulus by means of a motor driven chemical injector pump, or it may be pumped periodically (e.g., once every day or two) into the annulus by means of a so-called "boll weevil" device or s'milar arrangement. Where the inhibitor is a solid, it may be dropped into the well as a solid lump or stick, it may be blown in as a powder with gas, or it may be washed in with a small stream of the well fluids or other liquid. Where there is gas pressure on the casing, it is necessary, of course, to employ any of these treating methods through a pressure equalizing chamber equ'pped to allow introduction of reagent into the chamber equalizat'on of pressure between chamber and casing, and travel of reagent from chamber to well casing.

Occasionally, oil and gas wells are completed in such manner that there is no opening between the annulus and the bottom of the tubing or pump. This results, for example, when the tubing is surrounded at some point by a packing held by the casing or earth formation below the casing. In such wells the reagent may be introduced into the tubing through a pressure equalizing vessel after stopping the flow of fluids. After being so treated, the well should be left closed in for a period of time sufficient to permit the reagent to drop to the bottom of the well.

For injection into the well annulus, the corrosion inhibitor is usually employed as a solution in a suitable solvent, such as mineral oil, methylethyl ketone, xylene, kerosene, or even water. The selection of solvent will depend much upon the exact reagent being used and its solubility characteristics. It is also generally desirable to employ a solvent which will yield a solution of low freezing point, so as to obviate the necessity of heating the solution and injection equipment during winter use.

For treating wells with packed-off tubing, the use of solid "sticks" or plugs of inh:bitor is especially convenient. These may be prepared by blending the inhibitor with a mineral wax, asphalt or resin in a proportion sufficient to give a moderately hard and high-melting solid which can be handled and fed into the well conveniently.

The amount of corrosion preventive agent required in our process varies with the corrosiveness of the system, but where a continuous or semi-continuous treating procedure is carried out as described above, the addition of reagent in the proportion of from 5 parts per million to 1000 parts per m.llion or more parts of corrosive fluid will generally provide protection.

These corrosion inhibitors can be used in combination with other well-known corrosion inhibitors, for example, the cyclic amidine structures, the amido cyclic am:dine structures, and the amino cyclic amidine structures, as disclosed in the Blair and Gross Reissue Patent No. 23,227. When the herein described products are mixed with corrosion inhibitors of the conventional type in the ratio of one-to-three, one-to-one, three-to-one, or the like, in numerous instances the effectiveness of the corrosion inhibitor thus obtained is often significantly greater than the use of either one alone.

Since these products are basic, they can be combined with various acids to produce salts in which oil solubility is increased or decreased. Likewise, water solubility may be increased or decreased. For instance, the products may be mixed with one or more moles of an acid, such as higher fatty acids, dimerized fatty acids, naphthenic acids, acids obtained by the oxidation of hydrocarbons, as well as sulfonic acids such as dodecylbenzene sulfonic acid, petroleum mahogany acids, petroleum green acids, etc.

What has been said in regard to the acids which increase oil solubility and decrease water solubility applies with equal force and effect to acids of the type, such as acetic acid, hydroxyacetic acid, gluconic acid, etc., all of which obvious!y introduce hydrophile character when they form salts or complexes, if complexes are formed. For example, any of the acids described above to prepare the cyclic amidines are useful in preparing these salts.

As pointed out previously, the addition of corrosion inhibitors, particularly in the form of a solution by means of a metering pump or the like, is common practice. The particular corrosion inhibitors herein described are applied in the same manner as other corrosion inhibitors intended for use for the same purpose. For sake of brevity, one may use the corrosion inhibitor in solution form by dissolving it in a suitable solvent such as mineral oil, methyl ethyl ketone, xylene, kerosene, high boiling aromatic solvent, or even water.

The following examples are presented to illustrate the superiority of the instant compounds as corrosion inhibitors.

STIRRING TESTS

These tests are run on synthetic fluids. The procedure involves the comparison of the amount of iron in solution after a predetermined interval of time of contact of a standardized iron surface with a two-phase corrosive medium with similar determinations in systems containing inhibitors.

Six hundred ml. beakers equipped with stirrers and heaters are charged with 400 ml. of 10% sodium chloride containing 500 p.p.m. acetic acid and 100 ml. of mineral spirits. The liquids are brought to temperature and a 1 x 1 inch sand blasted coupon is suspended by means of a glass hook approximately midway into the liquid phase of the beaker. The stirrer is adjusted to agitate the liquids at such a rate as to provide good mixing of the two layers.

After 30 minutes samples of the aqueous phase are taken and the iron content of each sample is determined by measuring the color formed by the addition of hydrochloric acid and potassium thiocyanate in a photoelectric colorimeter.

The protection afforded by an inhibitor is measured by comparison of the amount of light absorbed by inhibited and uninhibited samples run simultaneously. Percent protection can be determined by the following formula:

$$\frac{A_1 - A_2}{A_1} \times 100 = \text{percent protection}$$

where $A_1$ is the present light absorbed by an uninhibited sample and $A_2$ is the same value for an inhibited sample.

TABLE VII

*Hot stirring test (140° F.); inhibitor concentration—40 p.p.m.*

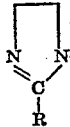

| R | R' | R'' | Percent protection |
|---|----|-----|--------------------|
| C₁₇H₃₃ | (CH₂)₄ | Duomeen T | 88 |
| C₁₇H₃₃ | ⟨⟩ | do | 92 |
| C₁₇H₃₃ | (CH₂)₈ | do | 86 |
| C₁₇H₃₃ | (CH₂)₄ | C₁₂H₂₅ | 91 |
| C₅H₁₁ | ⟨⟩ | Duomeen T | 97 |
| C₅H₁₁ | (CH₂)₈ | do | 84 |
| C₅H₁₁ | ⟨⟩ | do | 87 |
| (N—CH₂CH₂OH, C₁₇H₃₃) | | | 10 |

STATIC WEIGHT LOSS TESTS

These tests have been run on both synthetic and natural occurring fluids. The test procedure involved the measurement of the corrosive action of the fluids inhibited by the compositions herein described upon sandblasted S.A.E. 1020 steel coupons measuring ⅞ x 3¼ inches under conditions approximating those found in an actual producing well, and the comparison thereof with results obtained by subjecting identical test coupons to the corrosive action of identical fluids containing no inhibitor.

Clean pint bottles were charged with 200 ml. of 10% sodium chloride solution saturated with hydrogen sulfide and 200 ml. of mineral spirits and a predetermined amount of inhibitor was then added. In all cases the inhibitor concentration was based on the total volume of fluid. Weighed coupons were then added, the bottles tightly sealed and allowed to remain at room temperature for 3 days. The coupons were then removed, cleaned by immersion in inhibited 10% hydrochloric acid, dried and weighed.

The changes in the weight of the coupons during the corrosion test were taken as a measurement of the effectiveness of the inhibitor compositions. Protection percentage was calculated for each test coupon taken from the inhibited fluids in accordance with the following formula:

$$\frac{L_1 - L_2}{L_1} \times 100 = \text{percent protection}$$

in which $L_1$ is the loss in weight of the coupons taken from uninhibited fluids and $L_2$ is the loss in weight of coupons which were subjected to the inhibited fluids.

TABLE VIII

*Static weight loss test; inhibitor concentration—100 p.p.m.*

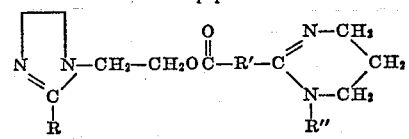

| R | R' | R'' | Percent protection |
|---|----|-----|--------------------|
| C₁₇H₃₃ | (CH₂)₄ | Duomeen T | 80.1 |
| C₁₇H₃₃ | ⟨⟩ | do | 93.0 |
| C₁₇H₃₃ | (CH₂)₈ | do | 90.6 |
| C₁₇H₃₃ | (CH₂)₄ | C₁₂H₂₅ | 93.6 |
| C₅H₁₁ | ⟨⟩ | Duomeen T | 81.2 |
| C₅H₁₁ | (CH₂)₈ | do | 94.5 |
| C₅H₁₁ | ⟨⟩ | do | 93.8 |
| (N—CH₂CH₂OH, C₁₇H₃₃) | | | 20.0 |

OTHER USES

These products are effective not only as corrosion inhibitors but can be used for a number of other purposes. For instance, they can be used as asphalt additives to increase the adhesiveness of the asphalt to the mineral aggregates. In the form of water soluble salts, they are useful as bactericides in the secondary recovery of oil. The hydroxycyclic amidines may be subjected to extensive oxyalkylation by means of ethylene oxide, propylene oxide, butylene oxide, or the like prior to reaction according to this invention. These are oxyalkylated and still have oil solubility as, for example, by the addition of propylene oxide or butylene oxide, or are oxyalkylated to produce water solubility as, for example, by means of ethylene oxide or glycide. They are also oxyalkylated by combinations of propylene oxide and ethylene oxide so that both water solubility and oil solubility remain. Thereupon they are reacted with the polycarboxylic acids and polyamines. Such products are useful for a variety of purposes and particularly for those where nonionic surfactants or sequestered cationic surfactants are indicated.

In addition, the compounds of this invention have the following uses:

Agriculture: kerosene, phenothiazine, pyrethrum sprays, fungicides, herbicidal oils.

Anti-static treatment: for hotel rugs, hospital floors, automobile upholstery, plastic and wax polishes, wool oils, lubricants for synthetic fibers.

Building materials: water repellant treatment for plaster, concrete, cement, roofing materials, air entrainment, floor sealers, linoleum.

Cosmetics: formulation of anti-perspirants, deodorants, sun screens, hair preparations.

De-emulsifying: in antibiotic extraction, breaking crude oil- and water-gas for emulsions.

Detergents: metal cleaning emulsions, lens cleaners, floor oils, dry cleaning detergents, radiator flushes, cesspool acid, boiler scale solvents, germicidal corrosion-inhibited acid detergents for dairies, enamel equipment, toilet bowls.

Leather: Fat liquoring oils, pickling, acid degreasing, dye fixative.

Metals: rust preventive oils, cutting oils, water displacing compounds, pickling inhibitor, solvent degreasing.

Paints: for improved adhesion of primers, preventing water spotting in lacquers, antiskinning, pigment flushing, grinding and dispersing, anti-feathering in inks.

Petroleum: germicide in flood water treatment, de-emulsifying fuel oil additives, anti-strip agent in asphalt emulsions and cutbacks.

Textiles: in rubberizing, textile oils, dyeing assistants, softening agents.

Miscellaneous: bentonite-amine complexes, metal-amine complexes, preparation of pentachlorphenates, quaternaries, plastisols, and rodent repellents.

Having thus described our invention, what we claim as new and desire to obtain by Letters Patent is:

1. A compound selected from the group consisting of

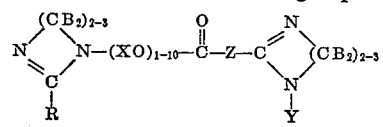

and

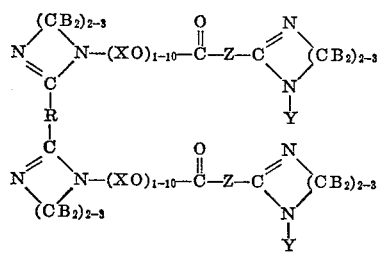

where B is selected from the group consisting of hydrogen and a lower alkyl group, X is a lower alkylene group having at least two carbon atoms, R and Z are hydrocarbon-containing moieties of a carboxylic acid, each having 1–36 carbon atoms, and Y is selected from the group consisting of hydrogen, a hydrocarbon group having 1–36 carbon atoms, and a member selected from the group consisting of $-C_nH_{2n}-NR_1-R_1$,

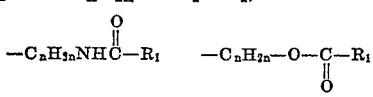

$-C_nH_{2n}-OR_1$, $-(C_nH_{2n}-NR_1)_xR_1$, and another cyclic amidine group wherein $R_1$ is selected from the group consisting of hydrogen and a hydrocarbon having 1–36 carbons, $n$ is 1–6, and $x$ is 1–10.

2. A compound of the formula

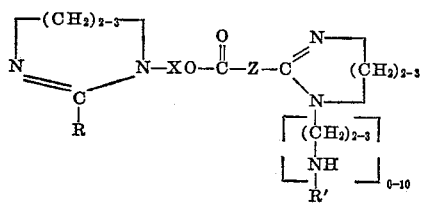

where X is a lower alkylene group, R and Z are hydrocarbon groups each having 1–36 carbon atoms and R' is selected from the group consisting of hydrogen and a hydrocarbon group having 1–36 carbon atoms.

3. A compound of the formula

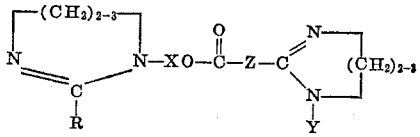

where R, Z and Y are hydrocarbon groups, each having 1–36 carbon atoms and X is a lower alkylene group.

4. The compound of claim 3 having one imidazoline and one tetrahydropyrimidine ring.

5. A compound of the formula

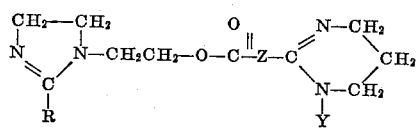

where R, Z and Y are hydrocarbon groups, each having 1–36 carbon atoms.

6. A compound of the formula

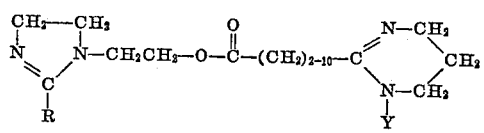

R is a hydrocarbon group having 5–17 carbon atoms and Y is a hydrocarbon group having 8–18 carbon atoms.

7. A compound of the formula

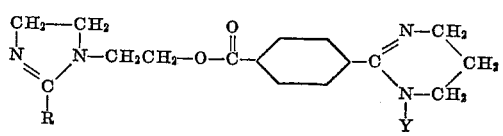

R is a hydrocrabon group having 5–17 carbon atoms and Y is a hydrocarbon group having 8–18 carbon atoms.

References Cited in the file of this patent

UNITED STATES PATENTS

| Number | Name | Date |
|---|---|---|
| 2,324,287 | D'Alelio | July 13, 1943 |
| 2,468,163 | Blair et al. | Apr. 26, 1949 |
| 2,468,180 | De Groote et al. | Apr. 26, 1949 |
| 2,516,626 | Haury | July 25, 1950 |
| 2,574,537 | De Groote et al. | Nov. 13, 1951 |
| 2,640,029 | Blair et al. | May 26, 1953 |
| 2,953,565 | Faust et al. | Sept. 20, 1960 |

OTHER REFERENCES

Hackh's Chemical Dictionary, page 805, Second Edition (1937).